United States Patent [19]

Voorhees

[11] Patent Number: 4,699,090
[45] Date of Patent: Oct. 13, 1987

[54] CHILD HARNESS

[75] Inventor: John L. Voorhees, Kensington, Md.

[73] Assignee: Productive Products Limited, Henderson, Ky.

[21] Appl. No.: 802,467

[22] Filed: Nov. 27, 1985

[51] Int. Cl.⁴ .............................................. A62B 35/00
[52] U.S. Cl. ..................................................... 119/96
[58] Field of Search .......................................... 119/96

[56] References Cited

U.S. PATENT DOCUMENTS

| | | | |
|---|---|---|---|
| 1,684,110 | 9/1928 | Pickles | 119/96 |
| 3,295,501 | 1/1967 | Riley | 119/96 |
| 4,537,154 | 8/1985 | Kay | 119/96 |

Primary Examiner—Paul J. Hirsch
Attorney, Agent, or Firm—Cushman, Darby & Cushman

[57] ABSTRACT

A body harness for an infant or small child is provided on a rear face thereof with a belt clip for engaging the conventional seat belt so that an adult constrained in the conventional seat belt may hold the infant in the harness with the child restrained by the harness while attached to the conventional seat belt.

7 Claims, 5 Drawing Figures

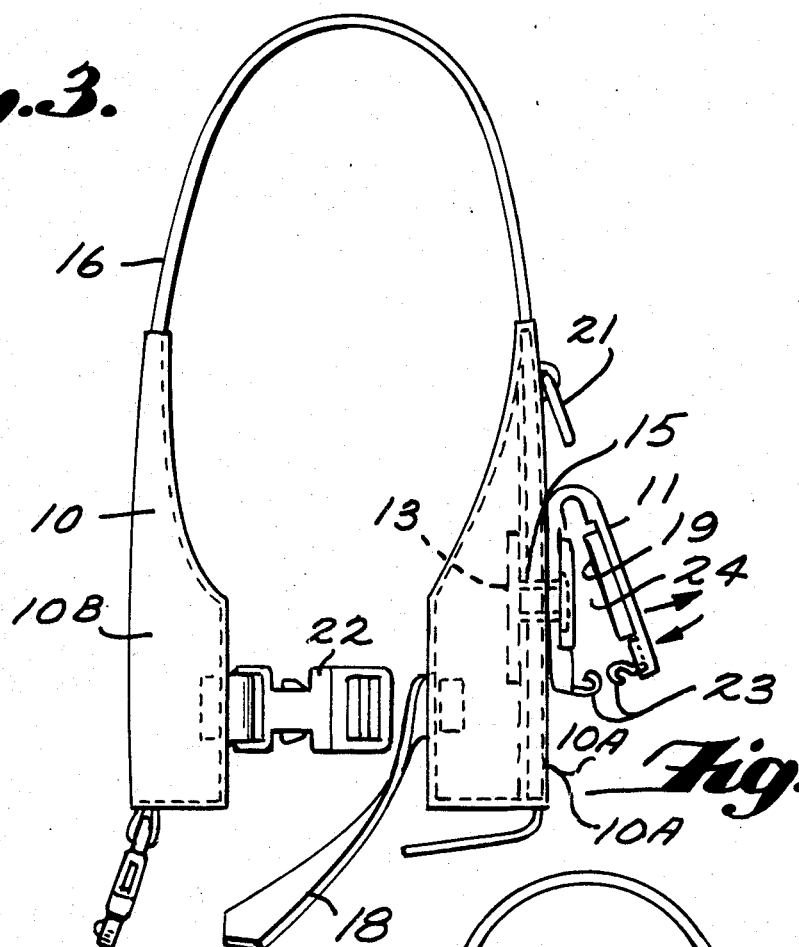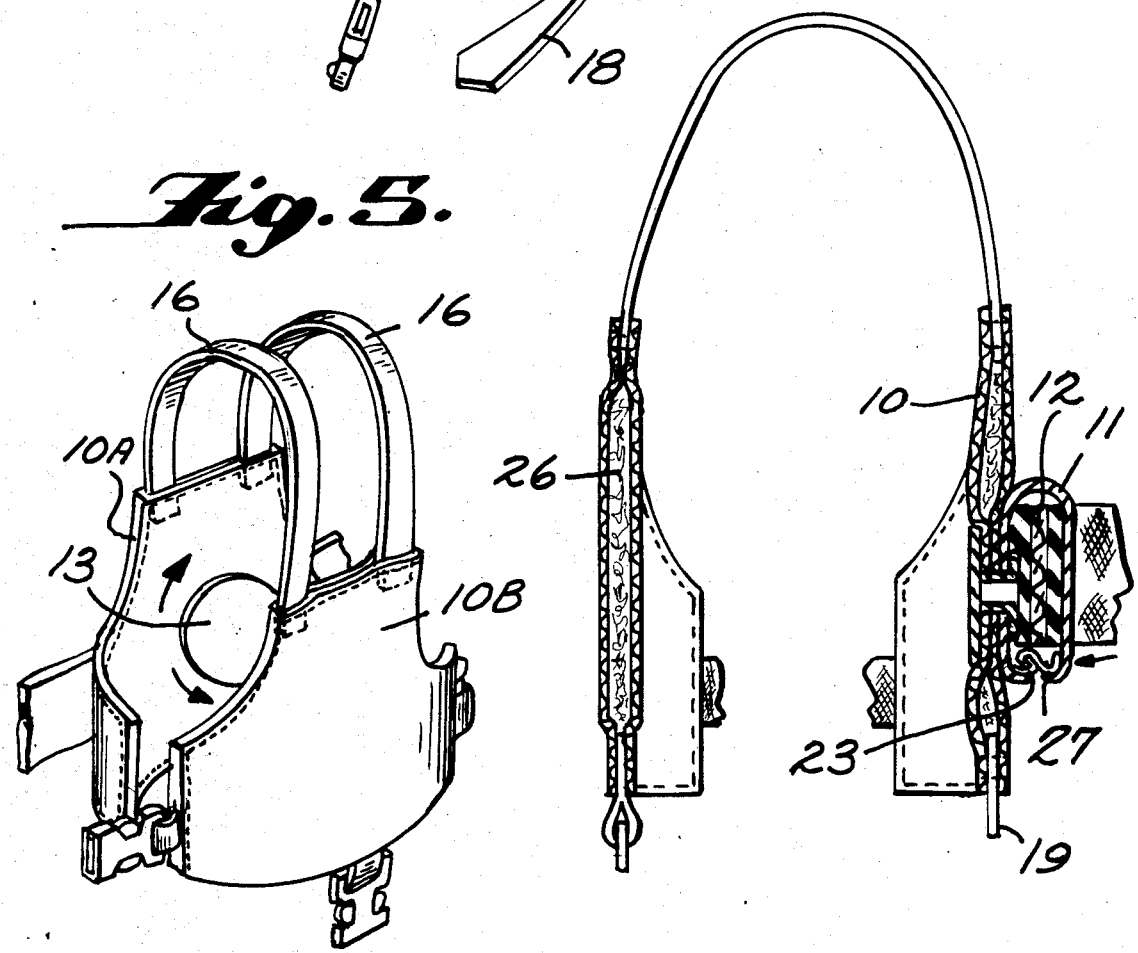

CHILD HARNESS

BACKGROUND AND SUMMARY OF THE INVENTION

The present invention relates to a child harness for use in transportation such as automobiles and airplanes where an adult would normally hold the child in his or her lap while the adult is restrained by the conventional seat belt normally provided in such vehicles. With the child harness of the present invention, additional restraint is provided for the infant or small child by attaching the harness to the conventional seat belt to provide the required safety for the infant in the event of an accident or sudden stop.

In the past, in order to safely transport infants and small children, as well as severely retarded individuals, it has been necessary to install fairly elaborate restraining seats in automobiles to protect such persons from injury in the event of accident or sudden stops. In normal air travel passenger cabins, however, even rudimentary child restraints for infants or other individuals who require physical support by a human during travel have not been available. Instead, the normal adult would make use of the conventional seat belt provided in a passenger airline seat and then physically hold the infant or child in his or her lap during flight time. Obviously, during air travel, and especially during take-off and landings as well as rough weather, such accommodations are inferior and are likely to be a source of injury to the infant or small child.

Parents charged with the care of infants and small children who must make use of automobiles or vehicles of others on short notice often are left without the usual child restraining seat and in such circumstances also must resort to holding the child in his or her lap during the period of travel in the automobile that is available. As in the case with airline travel, the absence of adequate safety restraint in such circumstances for the infant and small child is highly undesirable as the child's only source of protection is the attention and the ability of the adult holding the child to prevent injury to the child in the event of accident or sudden stops. Frequently, however, as is well known, the ability of the adult to protect itself is largely speculative even where such an adult is restrained by the conventional seat belt provided in automobile vehicles. The child, however, normally held on the lap of the adult, is clearly subject to great injury.

It is an object of the present invention to provide a unique child restraining harness that has means for cooperating with the conventional seat belt in automobiles as well as passenger airlines to minimize the possibility of injury to the child that would otherwise be possible in the absence of such restraint.

In a preferred embodiment, the present invention provides a body harness that fits over the shoulders of the infant and is adjustable in size by straps which may be provided with quick release clips. The rear face of the harness is provided with a quick release buckle or clip that is sized and proportioned to fit snugly over a conventional seat belt of standard width. For long trips, the buckle is attached to the harness material in a secure manner but in such a way as to permit the buckle to rotate relative to the harness to allow some freedom of movement to the infant or small child during long trips but which will adequately restrain the child from movement away from the adult who is restrained by the seat belt to which the child is attached by the quick release buckle in the event of a mishap.

The foregoing and other advantages of the present invention will become apparent as consideration is given to the following detailed description, taken in conjunction with the accompanying drawings, in which:

BRIEF DESCRIPTION OF THE DRAWINGS

FIG. 3 is a side view in elevation of the harness;

FIG. 4 is a sectional view taken along lines 4—4 of FIG. 2; and

FIG. 5 is a perspective view of the harness of the present invention.

DETAILED DESCRIPTION OF THE INVENTION

Figure 1:
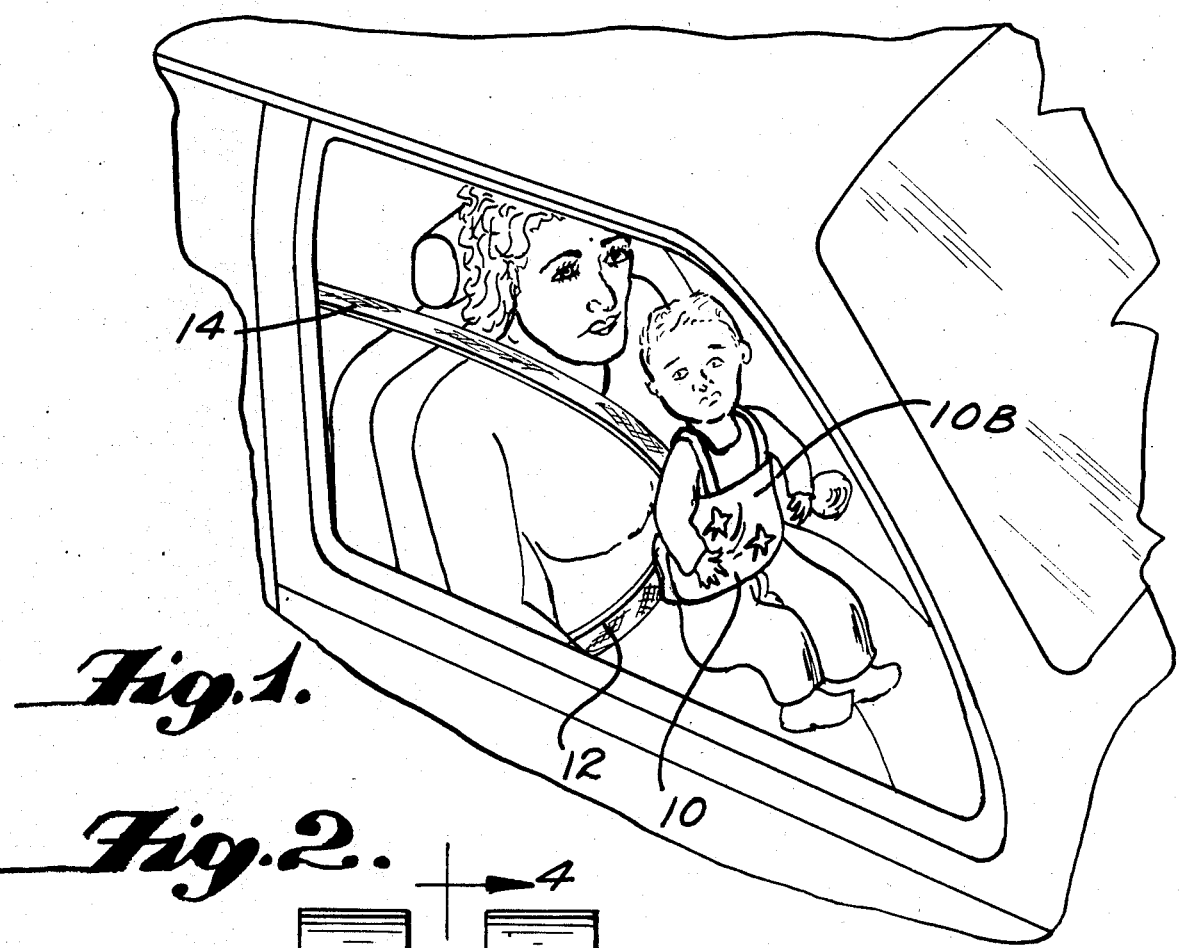
FIG. 1 is a perspective view of one environment in which the child harness of the present invention is utilized.

Referring now to the drawings wherein like numerals designate corresponding parts throughout the several views, there is shown in FIG. 1, a perspective view of an adult seated in an automobile and restrained by the conventional seat belt 12 and shoulder harness belt 14. In using the present invention, a child harness 10 is attached to a child, as shown, and the harness is then affixed, as described below, to the seat or lap belt 12 whereby movement of the infant or child in the event of a mishap during travel in the vehicle will be greatly minimized if not entirely eliminated, irrespective of the condition of the adult who is restrained by the belt 12.

Figure 2:
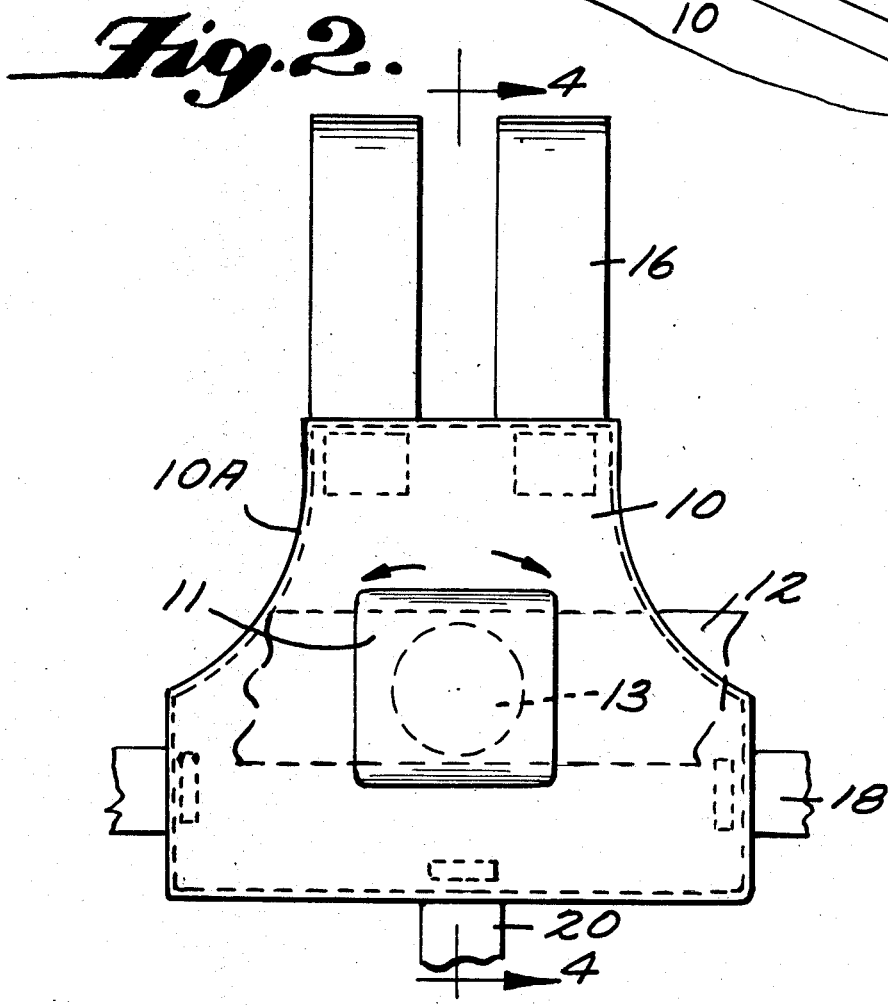
FIG. 2 is a rear view in elevation of the child harness of the present invention with parts broken away.

As shown in FIG. 2, the child harness 10 will include a rear panel 10A of sturdy textile material, preferably woven, to which straps 16, 18 and 20 should be securely fastened as by machine stitching at appropriate locations on the periphery of the front and rear panels 10A, 10B of the harness 10. The rear panel 10A has, preferably at a centrally located position, a movable buckle 11 fastened thereto, as described below. The buckle 11 is adapted to fit snugly over a conventional seat belt 12 in the manner illustrated.

It will be appreciated that the arrangement of the restraining straps 16, 18 and 20 is merely exemplary and that other arrangements may be called for depending on the size and physical condition of the individual to be restrained thereby.

With reference now to FIG. 3, it will be seen that the buckle 11, which may be made of spring steel, is of generally U-shaped configuration. The inner wall which is in contact with the outer surface of panel 10A is secured by a rivet 15 to a plate 13 with the buckle 11 being rotatable about the rivet 15 and in relatively snug contact with the inner surface of the panel 10A. The size of the plate 13 is such that it cannot pull through the panel. In addition, the plate is round without sharp edges to prevent injury to a wearer. Conversely, the rivet 15 and plate 13 may be welded together so that the entire assembly may be rotatable as indicated in FIG. 5. In any event, the interior surfaces of the buckle 11 may be provided with rectangular pads such as indicated at 19. With this arrangement, when the conventional seat belt 12 is inserted into the space 24, the adult need merely push on the outside surface of the buckle 11 to bring the interengageable, resilient finger clasps 23 together as illustrated in FIG. 4. Release of the finger clasp 23 is effected by pressing on the area 27 to push the upper class inwardly whereby the spring metal of the buckle 11 will effect rapid separation and release of the engaged seat belt 12.

Also to the rear panel 10A of the harness 10, a simple ring 21 may be attached above the buckle 11. The ring 21 can be used, as is conventional, to attach a leash or tether to the child to prevent the child from roaming about when the harness is not being used in conjunction with a seat belt in a vehicle.

The restraining straps 18 and 20 may be provided with quick release clips 22 to facilitate installing the infant or child in the harness as well as removable of the child therefrom such as at the end of a trip. The shoulder strap 16 may be made adjustable so that the harness 10 may be altered to accommodate children of a wide variety of ages.

Preferably, the fabric of the panels 10A and 10B is provided with padding 26, as illustrated in FIG. 4 to give both strength and durability to the harness as well as to provide additional protection to the child in the event of a mishap.

Having described the invention, it will be apparent that various modifications may be made thereto without departing from the spirit and scope of this invention as defined in the appended claims.

What is claimed is:

1. A harness for restraining a person positioned in the lap of a person wearing a conventional seat belt, said harness comprising a panel means for attachment to a person's body, said panel means having inner and outer surfaces, buckle means for releasably latching onto the conventional seat belt, said buckle means being secured on said outer surface of said panel means, said panel means including strap means for securing said panel means on the person's body;

said panel means including a front and a rear panel each having a respective inner and outer surface with said inner surfaces of said panels facing each other, said buckle means being secured on said outer surface of said rear panel; and further including a plate member disposed adjacent said inner surface of said rear panel and a member extending through said rear panel and connecting said plate member to said buckle means.

2. The harness as claimed in claim 1, wherein said strap means includes straps adjustably connectable between portions of said front and rear panels to accommodate different sized persons.

3. The harness as claimed in claim 1, wherein said member extending through said rear panel is a rivet and said buckle means is rotatably connected to said rivet.

4. The harness as claimed in claim 1, wherein said plate member is disc shaped.

5. A harness for restraining a person positioned in the lap of a person wearing a conventional seat belt, said harness comprising a panel means for attachment to a person's body, said panel means having inner and outer surfaces, buckle means for releasably latching onto the conventional seat belt, said buckle means being secured on said outer surface of said panel means, said panel means including strap means for securing said panel means on the person's body, wherein said buckle means comprises a generally U-shaped member having clasp means at each free end thereof which are interengageable when pressed together.

6. The harness as claimed in claim 5, wherein said U-shaped member is made from spring steel.

7. The harness as claimed in claim 5, wherein said clasp means are resilient to permit rapid disengagement thereof.

* * * * *